(12) United States Patent
Hay

(10) Patent No.: US 6,748,728 B2  
(45) Date of Patent: Jun. 15, 2004

(54) RAKE SYSTEMS AND METHODS FOR REMOVING UNDERWATER VEGETATION

(76) Inventor: Doug Hay, 5917 Cheryl Ct., Ferndale, WA (US) 98248

( * ) Notice: Subject to any disclaimer, the term of this patent is extended or adjusted under 35 U.S.C. 154(b) by 0 days.

(21) Appl. No.: 10/099,071

(22) Filed: Mar. 14, 2002

(65) Prior Publication Data

US 2003/0172634 A1 Sep. 18, 2003

(51) Int. Cl.[7] .......................... A01D 44/00; A01D 7/06
(52) U.S. Cl. .............................. 56/8; 56/400.21
(58) Field of Search ............... 56/8, 400.01, 400.04, 56/400.05, 400.11, 400.16, 400.17, 400.21

(56) References Cited

U.S. PATENT DOCUMENTS

| | | | | | |
|---|---|---|---|---|---|
| 1,194,995 | A | * | 8/1916 | Green | 56/400.11 |
| 1,352,386 | A | * | 9/1920 | Rundberg | 56/400.06 |
| 1,723,616 | A | | 8/1929 | Hawkins | |
| 2,065,733 | A | * | 12/1936 | Pearson | 56/8 |
| 2,479,877 | A | * | 8/1949 | Storm | 56/400.19 |
| 2,635,911 | A | * | 4/1953 | Szillage | 56/400.08 |
| 2,949,003 | A | * | 8/1960 | Wilcox | 56/8 |
| 2,961,817 | A | | 11/1960 | Mtichell | |
| 3,367,048 | A | * | 2/1968 | Doughty | 37/316 |
| D270,226 | S | * | 8/1983 | Scarsciotti | 56/400.21 |
| 4,635,429 | A | * | 1/1987 | Cornelius | 56/400.18 |
| 4,644,740 | A | * | 2/1987 | Lee | 56/400.04 |
| 4,768,331 | A | | 9/1988 | Jones | |
| 4,774,804 | A | * | 10/1988 | Sands | 56/400.04 |
| 4,852,337 | A | * | 8/1989 | Peterson | 56/8 |
| 5,079,905 | A | | 1/1992 | Bergstrom | |
| 5,152,126 | A | | 10/1992 | Cousineau | |
| 5,493,850 | A | * | 2/1996 | Torkelson | 56/8 |
| 5,511,366 | A | * | 4/1996 | Roth | 56/8 |
| 6,250,054 | B1 | * | 6/2001 | Kramer | 56/8 |
| 6,463,609 | B1 | * | 10/2002 | Acott, II | 5/673 |

* cited by examiner

*Primary Examiner*—Robert E. Pezzuto
*Assistant Examiner*—Nathan Mammen
(74) *Attorney, Agent, or Firm*—Michael R. Schacht

(57) ABSTRACT

A rake system for removing underwater vegetation comprising a plate assembly, a handle assembly, and a line. The plate assembly comprises first and second engaging members each defining an engaging edge. The handle assembly is attached to the plate assembly. The line is attached to the handle assembly. During use, the user grips the handle assembly to toss the plate assembly to a first underwater location. The user then pulls the line to displace the plate assembly from the first underwater location along a harvest path. The engaging edges of the engaging members are adapted to engage the underwater vegetation to fix the underwater vegetation relative to the plate assembly such that continued pulling on the line removes the underwater vegetation in a harvest region defined by the harvest path.

21 Claims, 3 Drawing Sheets

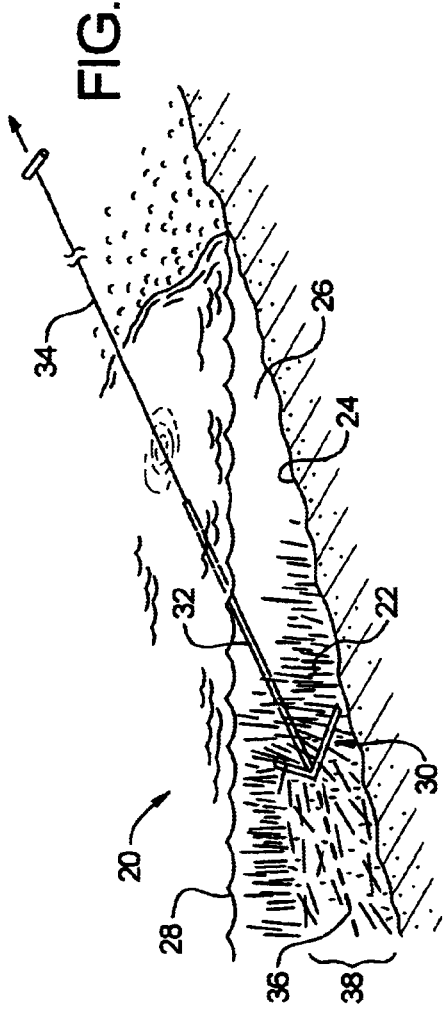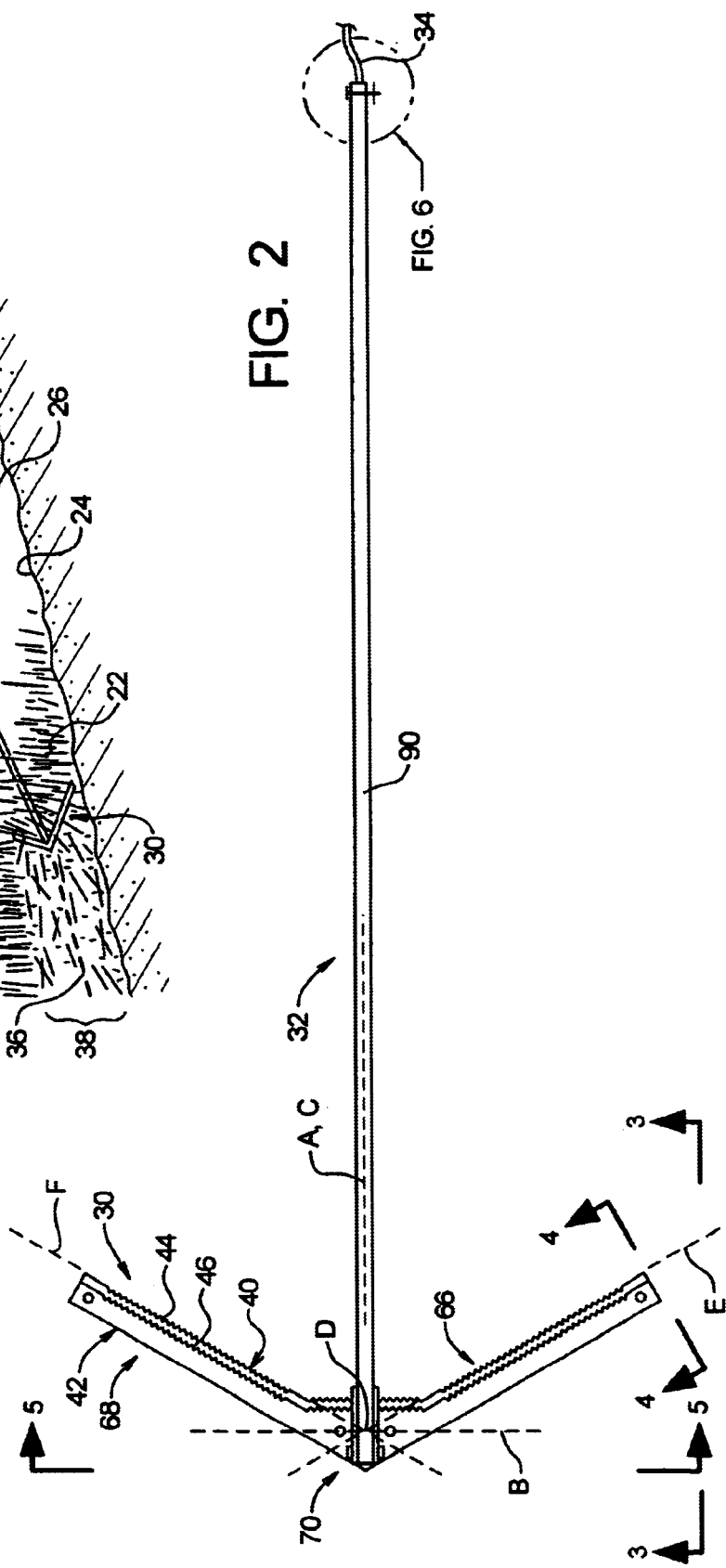

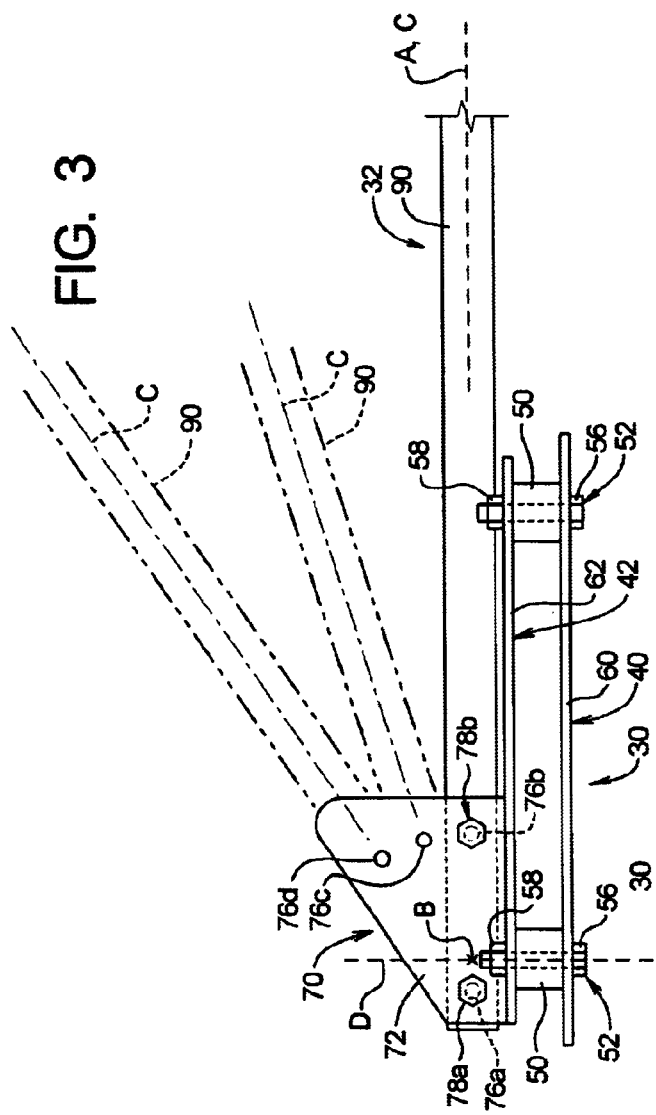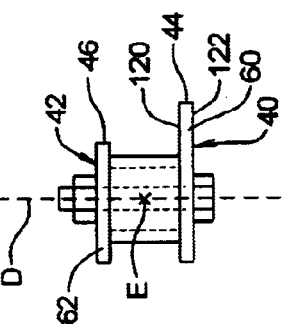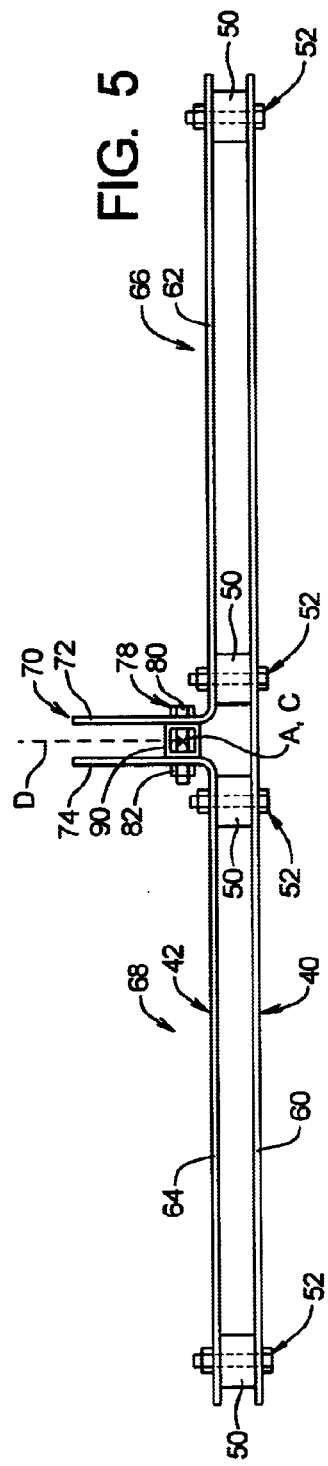

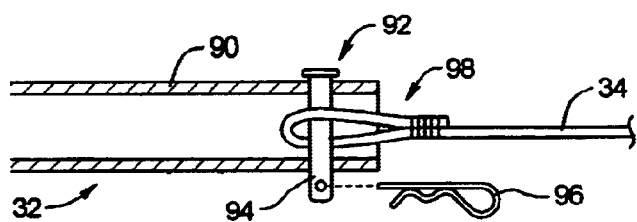
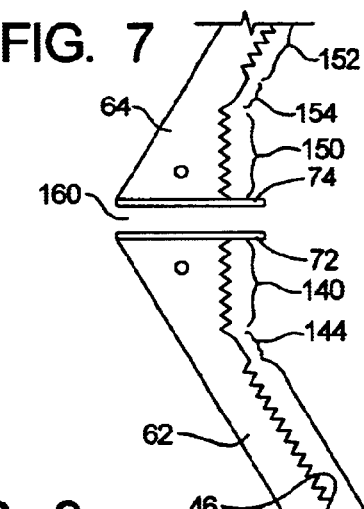
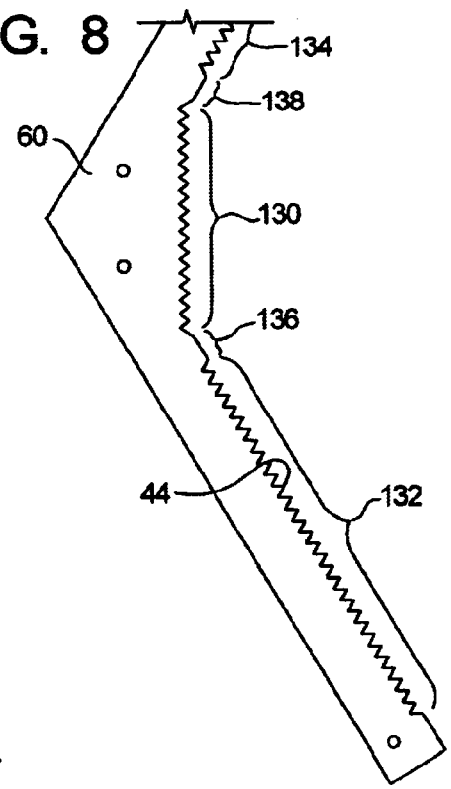
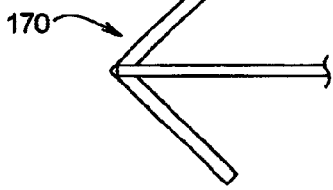
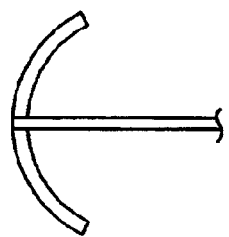
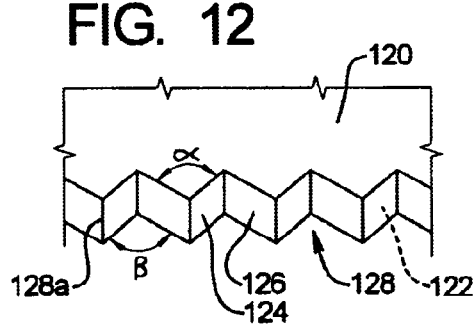

RAKE SYSTEMS AND METHODS FOR REMOVING UNDERWATER VEGETATION

TECHNICAL FIELD

The present invention relates to systems and methods for removing underwater vegetation and, in particular, to hand tools that allow a user on the shore or in a boat to remove underwater vegetation.

BACKGROUND OF THE INVENTION

Underwater vegetation is a problem in many bodies of water. For example, underwater vegetation can interfere with recreational activities such as swimming and boating. Some species of underwater vegetation, especially non-native species, can infest a body of water to a degree that interferes with wildlife and degrades water quality.

Accordingly, numerous systems and methods have been developed to remove underwater vegetation. These systems range from relatively complicated under or in water harvesting activities to the use of hand tools such as garden rakes.

The present invention relates to hand tools adapted to remove underwater vegetation from the bed of a body of water such as a pond or a lake.

RELATED ART

A professional patentability search conducted on behalf of the applicant uncovered the following U.S. Patents:

| U.S. Pat. No. | Inventor Name | Title |
| --- | --- | --- |
| 5,152,126 | Cousineau | SYSTEM FOR UPROOTING AQUATIC PLANTS |
| 5,079,905 | Bergstrom | FLOATING WEED RAKE |
| 4,774,804 | Sands | SAND TRAP RAKE AND GOLF BALL RETRIEVER AND METHOD |
| 4,768,331 | Jones | LAKE RAKE |
| 2,961,817 | Mitchell | DRAG RAKE FOR CUTTING AND RAKING UNDERWATER GROWTH |
| 1,723,616 | Hawkins | BRUSH RAKE |

The Jones, Bergstrom, and Mitchell patents all disclose mechanical rakes adapted to remove vegetation from ponds or lakes.

The Jones patent employs teeth designed to present low resistance when pushed in an outward direction and which dig into the ground on the return, inward direction. The teeth are designed to break up the ground and remove the vegetation by the roots.

The Mitchell patent is designed to cut underwater growth off immediately above the bottom of the water. To this end, the Mitchell device employs a curved plate having a sharpened inner edge that is pulled such that the sharpened edge moves along the lake bottom cutting the plants just above their roots. The Mitchell device is not intended to remove the plants by their roots. To the contrary, the Mitchell device is constructed to keep the parts thereof from digging into the ground and thereby loosening the roots.

The Bergstrom device is designed to remove vegetation from the surface and thus employs a floating rig head. The Bergstrom device engages only the upper ends of the plants and would not be effective at removing the plants by their roots; plants engaged by the Bergstrom device may break anywhere between the upper portion of the plant and the root.

The Cousineau patent is not a strictly mechanical device, but instead uses pressurized water to break up the ground in which the underwater vegetation is growing. The Cousineau device is not a rake in the traditional sense in that it is not intended to mechanically collect vegetation, although this may occur to a small degree. Instead, the purpose of this device appears to be to loosen the vegetation, which will then be removed by other means.

The Sands patent discloses a device for removing a golf ball from the water. This device comprises a rigid piece having upper and lower vertical serrations. These serrations are not intended to remove vegetation. To the contrary, the device is also intended to function as a rake for maintaining sand traps. The serrations are primarily intended for sand trap maintenance, although the rake can also be used to remove golf balls from bodies of water.

The Hawkins patent discloses a rake for brush that comprises a plurality of generally vertical plates that are serrated. This rake is intended for removing brush and not for underwater vegetation.

From the foregoing, it can be seen that the need exists for improved rake systems and methods for removing underwater vegetation.

SUMMARY OF THE INVENTION

The present invention may be embodied as a rake system for removing underwater vegetation comprising a plate assembly, a handle assembly, and a line. The plate assembly comprises first and second engaging members each defining an engaging edge. The handle assembly is attached to the plate assembly. The line is attached to the handle assembly. During use, the user grips the handle assembly to toss the plate assembly to a first underwater location. The user then pulls the line to displace the plate assembly from the first underwater location along a harvest path. The engaging edges of the engaging members are adapted to engage the underwater vegetation to fix the underwater vegetation relative to the plate assembly such that continued pulling on the line removes the underwater vegetation in a harvest region defined by the harvest path.

BRIEF DESCRIPTION OF THE DRAWINGS

FIG. 1 is a perspective view showing an exemplary water rake constructed in accordance with the principles of the present invention being used to remove underwater vegetation;

FIG. 2 is a top plan view depicting the water rake of FIG. 1;

FIG. 3 is a partial side elevation view depicting the angular relationship between a plate assembly and a handle assembly of the water rake of FIG. 1;

FIG. 4 is an elevation view taken along one end of the plate assembly of the water rake of FIG. 1;

FIG. 5 is front elevation view of the water rake of FIG. 1;

FIG. 6 is a partial section view of the portion of the handle assembly circled in FIG. 1;

FIG. 7 is a partial top plan view of upper plates of the plate assembly of the water rake of FIG. 1;

FIG. 8 is a partial top plan view of a lower plate of the plate assembly of the water rake of FIG. 1;

FIGS. 9–11 are top plan views of additional embodiments of the present invention showing alternative plate assembly profiles; and FIG. 12 is a partial, perspective, close-up view of the serrations on the engaging members of the exemplary water rake of FIG. 1.

DETAILED DESCRIPTION OF THE PREFERRED EMBODIMENTS

Referring initially to FIG. 1 of the drawing, depicted at 20 therein is a rake system constructed in accordance with, and embodying, the principles of the present invention. In the following discussion, the basic construction and operation of the exemplary rake system 20 will first be described. After that the details of construction and operation of the system 20 will be described in further detail.

I. Basic Operation of Preferred Embodiment

FIG. 1 depicts the rake system 20 being used to remove underwater vegetation 22 from the bed 24 of a body of water 26. The underwater vegetation 22 is typically a noxious or non-native species of plant that is disruptive of the ecosystem of the water 26; in other situations, the vegetation 22 may interfere with recreational activities or is simply undesirable for aesthetic reasons. Typically, such vegetation 22 has a root system in the bed 24 and extends up towards or to a surface 28 of the water 26.

The body of water 26 is typically a man-made or natural pond, lake, or the like. Such freshwater bodies are more susceptible to infestation by undesired underwater vegetation, but the rake system 20 may be used in other bodies of water as necessary.

The exemplary rake system 20 comprises a plate assembly 30, a handle assembly 32, and a line 34. The plate assembly 30 is connected to one end of the handle assembly 32, and the line 34 is connected to the other end of the assembly 32. The line 34 is or may be conventional and will not be described herein in detail.

In the following discussion, the terms "front" or "forward" refer to the direction along the handle assembly 32 towards the plate assembly 30, and the terms "back" or "rear" refer to the direction along the handle assembly 32 towards the line 34. The rake system 20 may be oriented in any direction, and the terms "up" or "upper" and "down" or "lower" are used herein to refer to the system 20 during normal use. In addition, the term "harvest" simply refers to the gathering in of the underwater vegetation. Typically, the harvested vegetation is simply discarded. The vegetation may be consumed or otherwise further processed after removal. The use of the term "harvest" should not, however, be construed as requiring such consumption or other further processing.

The rake system 20 is used basically as follows. The user may be standing on the shore adjacent to the body of water 26 or in a boat floating in the body of water 26. The user secures a free end of the line 34 and grasps the handle assembly 32. The user then tosses the handle assembly 32 and the plate assembly 30 in the forward direction into the water 26. The assemblies 30 and 32 sink to the water bed 24 under their own weight. At this point, the line 34 extends between the user above the water surface 28 and the handle assembly 32 on the bed 24.

The user then pulls, or causes to be pulled, the end of the line 34 above the water surface 28 such that the plate assembly 30 is displaced rearward along a harvest path 36. As the plate assembly 30 moves along the harvest path 36, the plate assembly 30 engages the vegetation 22 and removes at least a portion of the vegetation 22 in a harvest region 38 defined by the harvest path 36. Typically, the harvest region 38 extends equal distances on both sides of the harvest path 36.

This process is repeated for successive harvest paths 36 such that the harvest regions 38 overlap and the underwater vegetation 22 is removed from a larger area of the water bed 24. When the user is standing on the shore, the successive harvest paths 36 may be arranged in parallel rows; when the user is in an anchored boat, the successive harvest paths may radially extend from the boat. A boat may also be moved to drag the plate assembly 30 along the harvest paths 36. The exact pattern of the successive harvest paths 36 is not important as long as the paths result in removal of most or all of the underwater vegetation 22 in a larger area.

As will be described in further detail below, the plate assembly 30 is not intended to cut the underwater vegetation 22. Cutting the underwater vegetation 22 would leave the root system thereof intact, thereby allowing the underwater vegetation 22 quickly to reestablish itself in the harvest region. Instead, the rake system 20 is configured to engage the vegetation 22 such that the vegetation 22 is fixed relative to the plate assembly 30. After it is fixed relative to the plate assembly 30, pulling the line 34 causes at least a portion of the vegetation 22 engaged by the plate assembly 30 to be pulled out by its roots. The vegetation 22 may then be raised above the surface 28 and collected, usually for subsequent disposal. The rake system 20 thus removes the roots of the underwater vegetation 22 and thereby inhibits reestablishment of the vegetation 22 in the harvest region.

With the foregoing basic understanding of the construction and operation of the present invention, the details of construction and operation of the exemplary rake system 20 will now be described in further detail.

II. Plate Assembly

Referring now to FIGS. 2–5, it can be seen that the plate assembly 30 comprises a lower engaging member 40 and an upper engaging member 42. The engaging members 40 and 42 define upper and lower engaging edges 44 and 46, respectively. The exemplary plate assembly 30 further comprises a plurality of spacers 50 and plate bolt assemblies 52. The bolt assemblies 52 each comprise a bolt 56 and a nut 58. The plate assembly 30 is formed by extending each of the bolts 56 through an opening in the engaging members 40 and 42 and one of the spacers 50 and then threading the nuts 58 onto the bolts 56. Structures other than the spacers 50 and the bolt assemblies 52 can be used to secure the engaging members 40 and 42 together.

With the plate assembly 30 so assembled, the engaging edges 44 and 46 are adjacent to but offset slightly from each other and face the rear of the system 20. As will be described in further detail below, the engaging edges 44 and 46 are adapted to bind or otherwise grip the underwater vegetation 22 extending from the bed 24 in the direction of the surface 28 as the plate assembly 30 moves to the rear.

Accordingly, when the line 34 is pulled as described above, the engaging edges 44 and 46 engage the underwater vegetation 22; continued application of force to the line 34 will in most cases pull the vegetation 22 out by its roots. For the vegetation 22 to be pulled out by the roots, the stalk of the vegetation 22 must be strong enough transmit the pulling forces to the roots and the pulling forces must be sufficient to pull the roots from the bed 24. Usually, the roots of underwater vegetation 22 are easily pulled from the bed.

Less frequently, the roots are too strongly embedded to be pulled and the stalk of the plant may break. In rare cases, the roots are too strongly embedded to be pulled out and the stalk does not break; in these cases, the plate assembly 30 becomes snagged and special effort may be required to remove the system 20 from the snag.

FIGS. 2–5 also show that the exemplary lower engaging member 40 comprises a single lower plate member 60 and the exemplary upper engaging member 42 comprises first and second upper plate members 62 and 64. One half of the lower plate member 60 and the first upper plate member 62 define a first lateral portion 66 of the plate assembly 30. The other half of the lower plate member 60 and the second upper plate member 62 define a second lateral portion 68 of the plate assembly 30.

An attachment structure 70 connects the handle assembly 32 to the plate assembly 30. In particular, first and second head flanges 72 and 74 extend from the first and second upper plate members 62 and 64, respectively. A plurality of attachment holes 76 are formed in the head flanges 72 and 74. The attachment structure 70 further comprises handle bolt assemblies 78. The handle bolt assemblies 78 comprise bolts 80 and nuts 82. The bolts 80 extend through the attachment holes 76 and holes defined by the handle assembly 32; the nuts 82 are threaded onto the bolts 80 to form the connection between the plate assembly 30 and the handle assembly 32.

In the exemplary system 20, a center attachment hole 76a is formed in each of the flanges 72 and 74 and a plurality of peripheral attachment holes 76b–d are spaced along an arc centered about the center attachment hole 76a. One of the bolt assemblies 78a extends through the center attachment holes 76a, and another of the bolt assemblies 78b extends through one pair of the peripheral attachment holes 76b–d. This arrangement of attachment holes 76 and bolt assemblies 78 allows an angle at which the handle assembly 32 extends from the plate assembly 30 to be adjusted. The user may wish to adjust this angle depending upon the position from which the user is throwing the system 20, the terrain defined by the bed 24, the species of underwater vegetation 22 being removed, and other factors.

The exemplary plate members 60–64 are made of flat stock metal that will sink when thrown in the water. As generally discussed above, the lower plate member 60 is a single piece of metal; the upper plate members 62 and 64 are symmetrical but mirror images of each other. The flanges 72 and 74 are integrally formed with the plate members 62 and 64 by bending portions of the plate members 62 and 64 at a right angle. When the plate assembly 30 is assembled, upper plate members 62 and 64 lie in substantially the same plane, and this plane is spaced from and parallel to the plane occupied by the lower plate member 60. The flanges 72 and 74 are spaced from and parallel to each other when the plate assembly 30 is assembled.

III. Handle Assembly

As perhaps best shown in FIGS. 2 and 6, the exemplary handle assembly 32 comprises a handle member 90 and a line pin assembly 92. The exemplary handle member 90 is a length of square tubing. As perhaps best shown in FIG. 5, the cross-sectional length of the sides of the tubing from which the handle member 90 is made is substantially the same as the distance between the flanges 72 and 74 of the plate members 62 and 64. The bolts 80 of the handle bolt assemblies 78 extend through holes formed in the handle member 90 and the flanges 72 and 74 contact the handle member 90 to form a substantially rigid connection between the handle member 90 and the plate assembly 30.

In the exemplary rake system 20, the line pin assembly 92 connects the handle assembly 32 to the line 34. In particular, as shown in FIG. 6 the line pin assembly 92 comprises a line pin 94 and a retaining pin 96. A line loop 98 is formed on the end of the line 34 to be connected to the handle assembly 32. The line loop 98 is inserted into the hollow interior of the handle member 90. The line pin 94 is then inserted through a hole in one side of the handle member 90, through the line loop 98, and through a hole in another side of the handle member 90. The retaining pin 96 is then placed on the line pin 94 to prevent it from being withdrawn from the holes in the handle member 90. The line pin 94 in turn prevents the line loop 98 from being withdrawn from the hollow interior of the handle member 90, thereby securing the line 34 to the handle assembly 32.

IV. Engaging Edges

Referring now to FIGS. 2, 4, and 8–12, the exemplary engaging edges 44 and 46 will now be described in further detail. Several characteristics of the exemplary engaging edges 44 and 46 work together to increase the effectiveness rake system 20. These characteristics will be referred to herein as engaging characteristics. The preferred embodiment uses all of the engaging characteristics described herein, but any one of these engaging characteristics may be used alone to enhance the ability of the rake system 20 to the remove underwater vegetation 22. The present invention may thus be embodied using any one or any combination of the engaging characteristics.

The spatial relationship between the engaging edges 44 and 46 also forms one or more of the engaging characteristic of these edges 44 and 46. To help define the spatial relationships between the edges 44 and 46, a number of reference axes will first be described relative to the system 20. In particular, a system axis A and a lateral axis B are defined for the system 20 with reference to the plate assembly 30. The system axis A extends through the plate assembly 20 in the front and back directions; the lateral axis B extends at a right angle to the system axis A from side to side relative to the plate assembly 20.

The handle member 90 defines a pull axis C along which the pulling forces are applied through the handle member 90 to the plate assembly 30. The pull axis C can be aligned with the system axis A as shown by solid lines in FIG. 3 or extend at one or more angles with respect to the system axis A as shown by broken lines in FIG. 3.

The plate assembly 30 further defines a plate axis D that extends at right angles to the system axis A and the lateral axis B. The first and second lateral portions 66 and 68 of the plate assembly 30 define first and second engaging axes E and F. The engaging axes E and F lie within the plane defined by the system and lateral axes A and B.

The primary engaging characteristics of the exemplary engaging edges 44 and 46 will now each be described separately.

A. Engaging Surfaces

Referring for a moment to FIG. 12, depicted therein is a close-up view of any one of the exemplary engaging edges 44 or 46. FIG. 12 shows that the plate members 60–64 define an upper surface 120 and a lower surface 122. FIG. 12 further shows that the engaging edges 44 and 46 are defined by a plurality of first and second engaging surfaces 124 and 126. The exemplary first engaging surfaces 124 are substantially parallel with each other, and the exemplary second engaging surfaces 126 are parallel with each other. The exemplary engaging surfaces 124 and 126 are both substantially perpendicular to the upper and lower surfaces 120 and 122.

The engaging surfaces 124 and 126 intersect at a first and second engaging angles $\alpha$ and $\beta$ as shown in FIG. 12. In the exemplary system 20, these angles $\alpha$ and $\beta$ are substantially equal and are approximately sixty degrees. These angles $\alpha$ and β need not be equal, however, and are preferably within a range of twenty and one-hundred sixty degrees. The engaging angles α and β are not critical and will vary from one embodiment of the present invention to the another such embodiment.

With the engaging edges 44 and 46 formed by the engaging surfaces 124 and 126 as just described, the edges 44 and 46 do not define sharp cutting surfaces perpendicular to vertically oriented fibers of vegetation 22 extending from the bed 24 to the surface 28. The engaging edges 44 and 46 thus do not cut the vegetation 22, as generally described above. To the contrary, the structure of the engaging edges 44 and 46 causes these edges 44 and 46 to mechanically engage the vegetation 22 such that forces applied along the pull axis C are transferred along the fibers of the vegetation 22. The transfer of forces along these fibers enables the vegetation 22 to be pulled out of the bed 24 by the roots under many situations.

The angles between engaging surfaces 124 and 126 form serrations or teeth on the engaging edges 44 and 46 that assist in binding or gripping the underwater vegetation 22. In particular, as the engaging edges 44 and 46 move along the harvest path 36, smaller diameter stalks of the vegetation 22 are forced into gaps 128 defined by the engaging surfaces 124 and 126. The gaps are v-shaped, and the narrowing gaps 128 increase the friction between the engaging surfaces 124 and 126 and the stalks to apply the pulling forces to the roots of the vegetation.

Larger diameter stalks may not fit entirely within the gaps 128. Teeth points 128a defined by the intersection of the engaging surfaces 124 and 126 may slightly pierce such larger diameter stalks. For the most part, this piercing will be along the fibers of vegetation and will not cut through these fibers. The teeth points 128a will thus assist in transferring pulling forces to the vegetation 22.

The engaging surfaces 124 and 126 thus form an engaging characteristic that functions to enhance the transfer of pulling forces to the underwater vegetation 22 without cutting the vegetation 22 and leaving the roots.

B. Edge Angles

FIGS. 7 and 8 also show that the exemplary engaging edges 46 and 48 are arranged to define discrete sections. The lower plate member 60 defines a first inner section 130, first and second outer sections 132 and 134, and first and second intermediate sections 136 and 138. The first upper plate member 62 defines a second inner section 140, a third outer section 142, and a third transition section 144. The second upper plate member 64 similarly defines a third inner section 150, a fourth outer section 152, and a fourth transition section 154. The use of the exemplary first and second upper plate members 62 and 64 results in a gap 160 between the second and third inner sections 140 and 150.

The inner sections 130, 140, and 150 generally line on the lateral axis B. The first and third outer sections 132 and 142 are parallel to the first engaging axis E, while the second and fourth outer sections 134 and 152 are parallel to the second engaging axis F.

In the exemplary rake system 20, the first and second engaging axes E and F are angled with respect to the system axis A. Preferably, the angles between the axes E and F and the system axis A are equal and are approximately sixty degrees. These angles are typically in a first preferred range of substantially between forty-five and eight-five degrees to obtain the angled engaging edges 44 and 46 described in this subsection. In other embodiments of the present invention, these angles may be within a second preferred range of substantially between forty-five and one-hundred thirty-five degrees.

With the angles in the first preferred range, a binding action is created on a large scale similar to that obtained by the v-shaped gaps 128 defined by the engaging surfaces 124 and 126. In particular, after the gaps 128 are filled with vegetation 22, subsequent stalks of the vegetation 22 will be directed towards the inner sections 130, 140, and 150, thereby increasing friction between the stalks already bound by the engaging members 40 and 42 and stalks that are subsequently encountered. Accordingly, even after the v-shaped gaps 128 are filled, the rake system 20 will continue to harvest the vegetation 22.

Referring now to FIGS. 9–11, depicted therein are several exemplary angular profiles 170, 172, and 174 that may be used to by a rake system of the present invention. The angular profile 170 depicted in FIG. 10 generally corresponds to the angular profile of the exemplary rake system 20 described in detail herein. The angular profile 172 of FIG. 9 is outside the first preferred range of angles set forth in this subsection but still within the second preferred range. The angular profile 174 of FIG. 10 employs a curved engaging edge. This curved engaging edge defines a continuously changing engaging axis, but the angle of the engaging axis defined at any point along the engaging edge of the profile 174 will be within the first preferred range defined above.

C. Edge Spatial Relationships

The exemplary rake system 20 of the preferred embodiment uses two engaging edges 44 and 46. Some of the benefits of the present invention may be obtained by using a single engaging edge implementing the engaging characteristics defined in the previous subsection. The use of two engaging edges 44 and 46 is preferred, however.

The two exemplary engaging edges 44 and 46 are generally aligned but are spaced from each as can best be seen in FIGS. 2 and 4. In particular, as shown in FIG. 2, these edges 44 and 46 are spaced from each other along the system axis A defined above. And as shown in FIG. 4, these edges 44 and 46 are spaced from each other along the plate axis D defined above. In particular, the lower engaging edge 44 is spaced forward and above the upper engaging edge 42.

Accordingly, when the pulling force is applied along the pull axis C, the lower engaging edge 44 first engages the vegetation 22. The upper engaging edge 46 engages the vegetation 22 shortly thereafter when the vegetation 22 is deformed. The use of the upper engaging edge 46 thus increases the surface area of the engaging surfaces 124 and 126 that comes in contact with the vegetation 22 and thus the friction between the engaging members 40 and 42 and the vegetation 22.

V. Summary

From the foregoing, it should be clear that the present invention may be embodied in forms other than those described above. A rake system constructed in accordance with the principles of the present invention may thus be embodied in one or more of a number configurations using any combination of the engaging characteristics described above. In addition, the construction of the plate assembly 30 and the handle assembly 32, while preferred, is not critical to the principles of the present invention in its broadest form. The scope of the present invention should thus be defined by the claims allowed during prosecution of the present invention and not the foregoing detailed description of the present invention.

What is claimed is:

1. A rake system for removing underwater vegetation comprising:
   a plate assembly comprising
      first and second engaging members each defining an engaging edge and a system axis, and
      a plurality of spacers arranged between the first and second engaging members such that the enagaging members are substantially parallel;
   a handle assembly attached to the plate assembly; and
   a line attached to the handle assembly; whereby
   the first and second engaging members are spaced from each other with reference to a plate axis, where the plate axis extends at an angle to the system axis;
   the handle assembly is gripped to toss the plate assembly to a first underwater location;
   the line is pulled in a direction substantially along the second axis to displace the plate assembly from the first underwater location along a harvest path; and
   the engaging edges of the engaging members are adapted to engage the underwater vegetation to fix the underwater vegetation relative to the plate assembly such that continued pulling on the line removes the underwater vegetation in a harvest region defined by the harvest path.

2. A rake system as recited in claim 1, in which at least one of the engaging members is spaced in a rear direction along the system axis relative to another of the engaging members.

3. A rake system as recited in claim 2, in which at least one of the engaging members is spaced in an upper direction along the plate axis relative to another of the engaging members.

4. A rake system as recited in claim 1, in which at least one of th engaging members is spaced in an upper direction along the plate axis relative to another of the engaging members.

5. A rake system as recited in claim 1, in which the plate assembly comprises first and second lateral portions that extend from the handle assembly.

6. A rake system as recited in claim 5, in which the lateral portions extend at an angle of substantially between forty-five and one-hundred thirty-five degrees with respect to the handle assembly.

7. A rake system as recited in claim 6, in which the lateral portions are canted towards the handle assembly at an angle of substantially between forty-five and eighty-five degrees with respect to the handle assembly.

8. A rake system as recited in claim 7, in which the lateral portions are canted towards the handle assembly at an angle of approximately sixty degrees with respect to the handle assembly.

9. A rake system as recited in claim 1, in which the engaging edges of the first and second engaging members engage the underwater vegetation and fix the underwater vegetation relative to the plate assembly.

10. A rake system as recited in claim 1, in which engaging edge of the first plate member engages the underwater vegetation and fixes the underwater vegetation relative to the plate assembly.

11. A rake system as recited in claim 10, in which the engaging edge of the second plate member engages the underwater vegetation and fixes the underwater vegetation relative to the plate assembly.

12. A rake system as recited in claim 1, in which the engaging edges of the first and second engaging members are serrated.

13. A rake system as recited in claim 12, in which:
   the engaging members each define an upper surface and a lower surface; and
   the engaging members each further define a plurality of engaging surfaces that extend at angles to each other to form the serrated engaging edge, where the engaging surfaces form a wedge that engages portions of the underwater vegetation.

14. A rake system as recited in claim 13, in which a plurality of the engaging surfaces intersect at least one engaging surface adjacent thereto at an angle of substantially between twenty and one-hundred sixty degrees.

15. A rake system as recited in claim 1, in which:
   the plate assembly additionally comprises a third engaging member; and
   the second and third engaging members are arranged above the first engaging member on opposite sides of the handle assembly.

16. A rake system as recited in claim 1, in which the engaging edges of the respective first and second engaging members are offset from each other with reference to the system axis.

17. A rake system for removing underwater vegetation comprising:
   a plate assembly comprising
      first, second, and third engaging members each defining an engaging edge,
      a plurality of bolt assemblies for securing the engaging members together, and
      a plurality of spacers for maintaining the engaging members in a predetermined relationship;
   a handle assembly attached to the plate assembly; and
   a line attached to the handle assembly; whereby
   the second and third engaging members are spaced from the first engaging member with reference to a plate axis and the engaging edges of the second and third engaging members are offset from the engaging edge of the first engaging member with reference to a system axis, where the plate axis extends at an angle to the system axis;
   the handle assembly is gripped to toss the plate assembly to a first underwater location;
   the line is pulled in a direction along the second axis to displace the plate assembly from the first underwater location along a harvest path; and
   the engaging edges of the engaging members are adapted to engage the underwater vegetation and fix the underwater vegetation relative to the plate assembly such that pulling on the line removes the underwater vegetation in a harvest region defined by the harvest path.

18. A rake system for removing underwater vegetation comprising:
   a plate assembly comprising first and second engaging members defining an upper surface, a lower surface, and a plurality of engaging surfaces, where the plurality of engaging surfaces form first and second serrated engaging edges, where
      the engaging surfaces form a wedge that engages portions of the underwater vegetation, and
      a plurality of the engaging surfaces intersect at least one engaging surface adjacent thereto at an angle of substantially between twenty and one-hundred sixty degrees;
   a handle assembly attached to the plate assembly; and
   a line attached to the handle assembly; whereby the handle assembly is gripped to toss the plate assembly to a first underwater location;

the line is pulled to displace the plate assembly from the first underwater location along a harvest path; and the engaging edges of the engaging members are adapted to engage the underwater vegetation to fix the underwater vegetation relative to the plate assembly such that continued pulling on the line removes the underwater vegetation in a harvest region defined by the harvest path.

19. A rake system for removing underwater vegetation comprising:

a plate assembly comprising
first, second, and third engaging members each defining an engaging edge,
a plurality of bolt assemblies for securing the engaging members together, and
a plurality of spacers for maintaining the engaging members in a predetermined relationship;

a handle assembly attached to the plate assembly; and a line attached to the handle assembly; whereby the rake system defines a system axis and a plate axis, where the plate axis is perpendicular to the system axis, the second and third engaging members are spaced along the system axis relative to the first engaging member, and the spacers space the second and third engaging members along the plate axis relative to the first engaging member;

the handle assembly is gripped to toss the plate assembly to a first underwater location;

the line is pulled to displace the plate assembly from the first underwater location along a harvest path; and the engaging edges of the engaging members are adapted to engage the underwater vegetation and fix the underwater vegetation relative to the plate assembly such that pulling on the line removes the underwater vegetation in a harvest region defined by the harvest path.

20. A rake system for removing underwater vegetation comprising:

a plate assembly comprising first and second engaging members each defining an engaging edge and a system axis, where
the engaging members each define an upper surface and a lower surface;
and the engaging members each further define a plurality of engaging surfaces that extend at angles to each other to form a serrated engaging edge, and
a plurality of the engaging surfaces intersect at least one engaging surface adjacent thereto at an angle of substantially between twenty and one-hundred sixty degrees;

a handle assembly attached to the plate assembly; and a line attached to the handle assembly; whereby the first and second engaging members are spaced from each other with reference to a plate axis, where the plate axis extends at an angle to the system axis;

the handle assembly is gripped to toss the plate assembly to a first underwater location;

the line is pulled in a direction substantially along the system axis to displace the plate assembly from the first underwater location along a harvest path; and the engaging surfaces form a wedge that engages portions of the underwater vegetation to fix the underwater vegetation relative to the plate assembly such that continued pulling on the line removes the underwater vegetation in a harvest region defined by the harvest path.

21. A rake system for removing underwater vegetation comprising:

a plate assembly comprising first, second, and third engaging members each defining an engaging edge and a system axis, where the second and third engaging members are arranged above the first engaging member on opposite sides of the handle assembly;

a handle assembly attached to the plate assembly; and a line attached to the handle assembly; whereby the first and second engaging members are spaced from each other with reference to a plate axis, where the plate axis extends at an angle to the system axis;

the handle assembly is gripped to toss the plate assembly to a first underwater location;

the line is pulled in a direction substantially along the system axis to displace the plate assembly from the first underwater location along a harvest path; and the engaging edges of the engaging members are adapted to engage the underwater vegetation to fix the underwater vegetation relative to the plate assembly such that continued pulling on the line removes the underwater vegetation in a harvest region defined by the harvest path.

* * * * *